Dec. 25, 1962  W. F. MOORE  3,069,841
REACTION MOTOR THRUST CONTROL VALVE
Filed Nov. 7, 1960

INVENTOR
WENDELL F. MOORE

BY
Beau, Brooks, Buckley & Beau.
ATTORNEY 3,069,841
REACTION MOTOR THRUST CONTROL VALVE
Wendell F. Moore, Youngstown, N.Y., assignor to Bell
Aerospace Corporation, Wheatfield, N.Y.
Filed Nov. 7, 1960, Ser. No. 67,821
3 Claims. (Cl. 60—35.5)

The present invention relates to a control valve and nozzle assembly particularly adapted for use in association with a space vehicle or the like to control and direct the flow of relatively hot, high pressure gas used as the propellant for the vehicle or the like.

At the present time space vehicles and the like are contemplated for use in outer space, these vehicles for the most part being of the type utilizing a reaction type of control for moving and positioning the vehicle. A convenient way in which to provide for such reaction control is to use a hot gas generator of known form and to controllably direct the relatively hot, high pressure gas thrust nozzles to obtain the requisite movement of the vehicle. The manner of controlling the flow of the hot gas must be positive and without any substantial time lag either in establishing the "on" or the "off" condition if accurate control and positioning of the vehicle is to be expected. Furthermore, the control mechanism used must be capable of proper operation in ambient temperature far below zero, it must provide a minimum of flow restriction and be effective to positively seal off the hot gas flow when necessary. It is therefore a primary object of the present invention to provide control mechanism having all of the above characteristics and which is yet of simple, effective and economical construction.

A further object of this invention is to provide a control mechanism as described which is directly associated with the thrust nozzle so that the thrust effect of residual hot gas, downstream of the control, will be reduced to a minimum to assure positive cut-off of the hot gas flow.

Another object of this invention is to provide a control device for the flow of high pressure, hot gas used as the propelling means for space vehicles and the like which incorporate a poppet type valve having an enlarged plenum chamber immediately adjacent the valve and upstream thereof so that positive control of starting will result.

Figure 1:
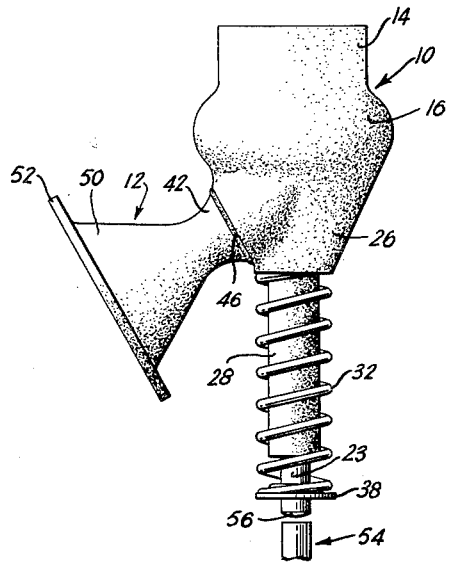
FIG. 1 is a side elevational view of the combined valve and nozzle assembly according to the principles of the present invention.
Figure 2:
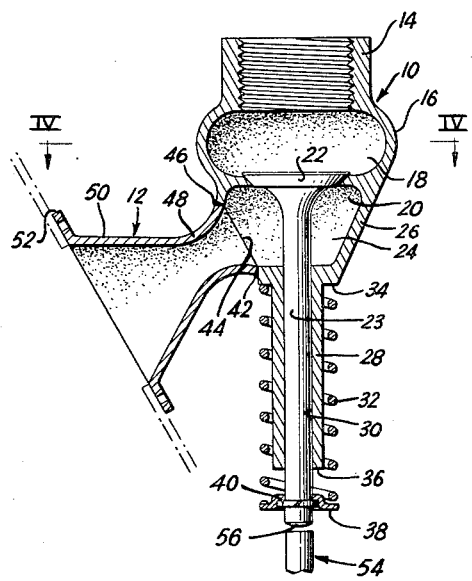
FIG. 2 is a vertical section of the assembly shown in FIG. 1 illustrating the plenum chamber and the proximity of the nozzle to the downstream side of the valve.
Figure 3:
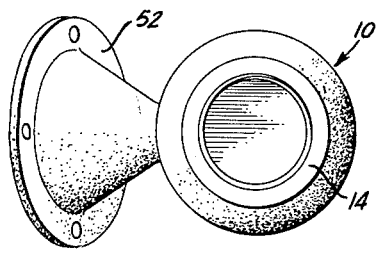
FIG. 3 is a top plane view of the device.
Figure 4:
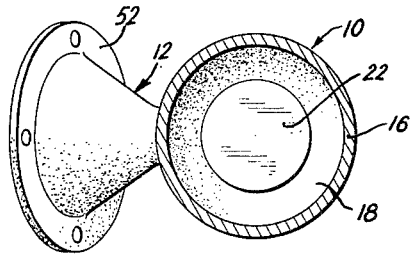
FIG. 4 is a horiozntal view taken along the plane of section line 4—4 in FIG. 2 looking into the plenum chamber.

As can be seen best in FIGS. 1 and 2, the assembly is constructed of two basic component parts, the valve body 10 and the nozzle assembly 12, the two being rigidly joined and in close proximity with each other. The valve body 10 includes an internally threaded inlet neck 14 and immediately therebelow is the bulbous wall 16 of an enlarged plenum chamber 18. The bottom wall 20 of the plenum chamber is provided with an opening presenting a valve seat which is associated with the head 22 of a poppet type valve, the stem 23 of which projects through the discharge chamber 24 downstream of the valve head 22 and which is contained within the tapering bottom wall portion 26 of the valve body.

Depending from the tapering bottom portion 26 of the valve body is an elongate guide portion 28 having a valve stem guide bore 30 extending axially therethrough and in alignment with the valve seat in the bottom wall 20 of the plenum chamber.

A compression spring 32 is seated at its upper end on the shoulder 34 formed at the juncture between the wall 26 and the guide 28 and extends therefrom to extend below the lower end 36 of the guide 28 and seats upon the spring retainer plate 38 associated with the valve stem 23. The plate 38 is located axially on the valve stem 23 by a suitable split cotter 40 received in the dished portion 42 of the plate 38 and it will be appreciated that the spring 32 when assembled in the manner shown in FIGS. 1 and 2, is initially under compression so as to assure seating of the valve head 22.

The discharge wall portion 26 of the valve body is provided with an opening at one side thereof and aligned with this opening is the entrance mouth portion 42 of the reaction nozzle 12, the nozzle and valve body being engaged along the parting line 44 and suitably rigidly interconnected thereat as by welding 46. The nozzle itself is of conventional construction and includes a constricted throat portion 48, a gradually enlarging diffusion portion 50 having an attachment flange 52 at its extremity whereby the entire assemblage may be secured to the structure with which it is associated as for example as is shown in dotted lines in FIG. 2.

Any suitable actuating means for operating the valve may be utilized such as a reciprocable plunger 54, a portion of which is shown in FIGS. 1 and 2. In any event, regardless of what means may be used specifically to effect the opening of the valve and to permit its closing, such means presents clearance 56 between the same and the tip of the valve stem 23 when the valve is closed. Utilizing such an actuating means does away with the necessity for incorporating the actuating means as a part of the control or valve structure and also minimizes heat transfer to the actuating mechanism since at any time that the valve if closed, the actuating means will be physically out of contact therewith. Further, by utilizing a poppet type valve, alignment of the actuating means is not critical and therefore distortion due to thermal gradients will not reduce the effectiveness of either the valve or its actuating mechanism.

It will be appreciated that as far as is possible, the wall thickness of the body 10 will be of uniform thickness to prevent distortion and misalignment due to temperature gradients. In conjunction with this, it would be appreciated that a valve of this type will be required to control the flow of hot, high pressure gas in ambient temperature far below zero and under conditions of extremely low ambient pressure. The elongate guide portion 28 effects not only a seal along the length of the stem 23 but also properly guides the valve for proper association with the valve seat in wall 20. The upper portion of the valve body is largest in the bulbous portion 16 so as to present the enlarged plenum chamber 18 which materially reduces the time lag in operation as the valve is opened, providing a ready reservoir of high pressure, hot gas in the immediate vicinity of the valve head 22. At the same time, it will be appreciated that the spring 32 need be only of sufficient strength as to cause initial seating of the valve head 22 whereafter the pressure of the hot gas will maintain the same in closed position.

The shape of the body is also important on the downstream side of the valve head 22 and for this reason is progressively decreased in cross section downwardly in the tapered portion 26 so as to minimize the volume of the downstream chamber 24 beneath the valve head 22. This is important in order to reduce as much as possible the residual hot gas downstream of the valve head 22 when the same is closed to thereby reduce any appreciable time lag between closing of the valve and cessation of thrust produced. This is also enhanced by the provision of the nozzle 12 directly in association with body 10 and in close proximity to the downstream side of the valve head 22. At the same time, the construction is such as to provide a minimum of restriction to the flow of the hot gas when the valve is open. For example, it will be noted that when open, the valve head 22 will be moved toward the region of the largest cross section of the plenum chamber 18 so as to permit of free flow of the hot gas around the valve head 22.

What is claimed is:

1. In a control valve assembly for space vehicles and the like, a hollow body having an inlet neck for connection to a hot gas generator, a bulbous side wall portion joined with said neck, and a downwardly tapering side wall portion joined with said bulbous portion, said body having an interior wall disposed substantially at the juncture between said bulbous portion and said downwardly tapering portion and forming, with said bulbous side wall portion, an enlarged plenum chamber, said interior wall having an opening forming a valve seat, an elongate guide portion of said body depending from said downwardly tapering portion and having a base therethrough axially aligned with said valve seat, a poppet type valve having a stem received in said guide and a head cooperable with said valve seat, said plenum chamber presenting a relatively large capacity reservoir immediately adjacent said valve head.

2. In a control valve assembly for space vehicles and the like, a hollow body having an inlet neck for connection to a hot gas generator, a bulbous side wall portion joined with said neck, and a downwardly tapering side wall portion joined with said bulbous portion, said body having an interior wall disposed substantially at the juncture between said bulbous portion and said downwardly tapering portion and forming, with said bulbous side wall portion, an enlarged plenum chamber, said interior wall having an opening forming a valve seat, an elongate guide portion of said body depending from said downwardly tapering portion and having a base therethrough axially aligned with said valve seat, a poppet type valve having a stem received in said guide and a head cooperable with said valve seat, said plenum chamber presenting a relatively large capacity reservoir immediately adjacent said valve head, means for opening and closing said valve including a member normally spaced from said valve stem but engageable therewith to open the valve.

3. In a control valve assembly for space vehicles and the like, a hollow body having an inlet neck for connection to a hot gas generator, a bulbous side wall portion joined with said neck, and a downwardly tapering side wall portion joined with said bulbous portion, said body having an interior wall disposed substantially at the juncture between said bulbous portion and said downwardly tapering portion and forming, with said bulbous side wall portion, an enlarged plenum chamber, said interior wall having an opening forming a valve seat, an elongate guide portion of said body depending from said downwardly tapering portion and having a bore therethrough axially aligned with said valve seat, a poppet type valve having a stem received in said guide and a head cooperable with said valve seat, said plenum chamber presenting a relatively large capacity reservoir immediately adjacent said valve head, said downwardly tapering wall portion having a discharge opening therein, and a reaction nozzle secured to said body directly at said discharge opening whereby said downwardly tapering wall portion presents the sole residual gas chamber when the valve is closed.

References Cited in the file of this patent

UNITED STATES PATENTS

| | | |
|---|---|---|
| 1,367,246 | Ewald | Feb. 1, 1921 |
| 2,135,966 | Daisley | Nov. 8, 1938 |
| 2,493,957 | Fitch | Jan. 10, 1950 |

FOREIGN PATENTS

| | | |
|---|---|---|
| 610,143 | Great Britain | Oct. 12, 1948 |

OTHER REFERENCES

Ser. No. 215,792, Neugebauer (A.P.C.), published April 27, 1943.

UNITED STATES PATENT OFFICE
CERTIFICATE OF CORRECTION

Patent No. 3,069,841                         December 25, 1962

Wendell F. Moore

It is hereby certified that error appears in the above numbered patent requiring correction and that the said Letters Patent should read as corrected below.

Column 1, line 20, before "thrust" insert -- generated thereby through one or more reaction or --; column 2, line 37, for "if" read -- is --; line 48, before "ambient" insert -- an --.

Signed and sealed this 4th day of June 1963.

(SEAL)
Attest:

ERNEST W. SWIDER                                    DAVID L. LADD
Attesting Officer                                        Commissioner of Patents